UNITED STATES PATENT OFFICE.

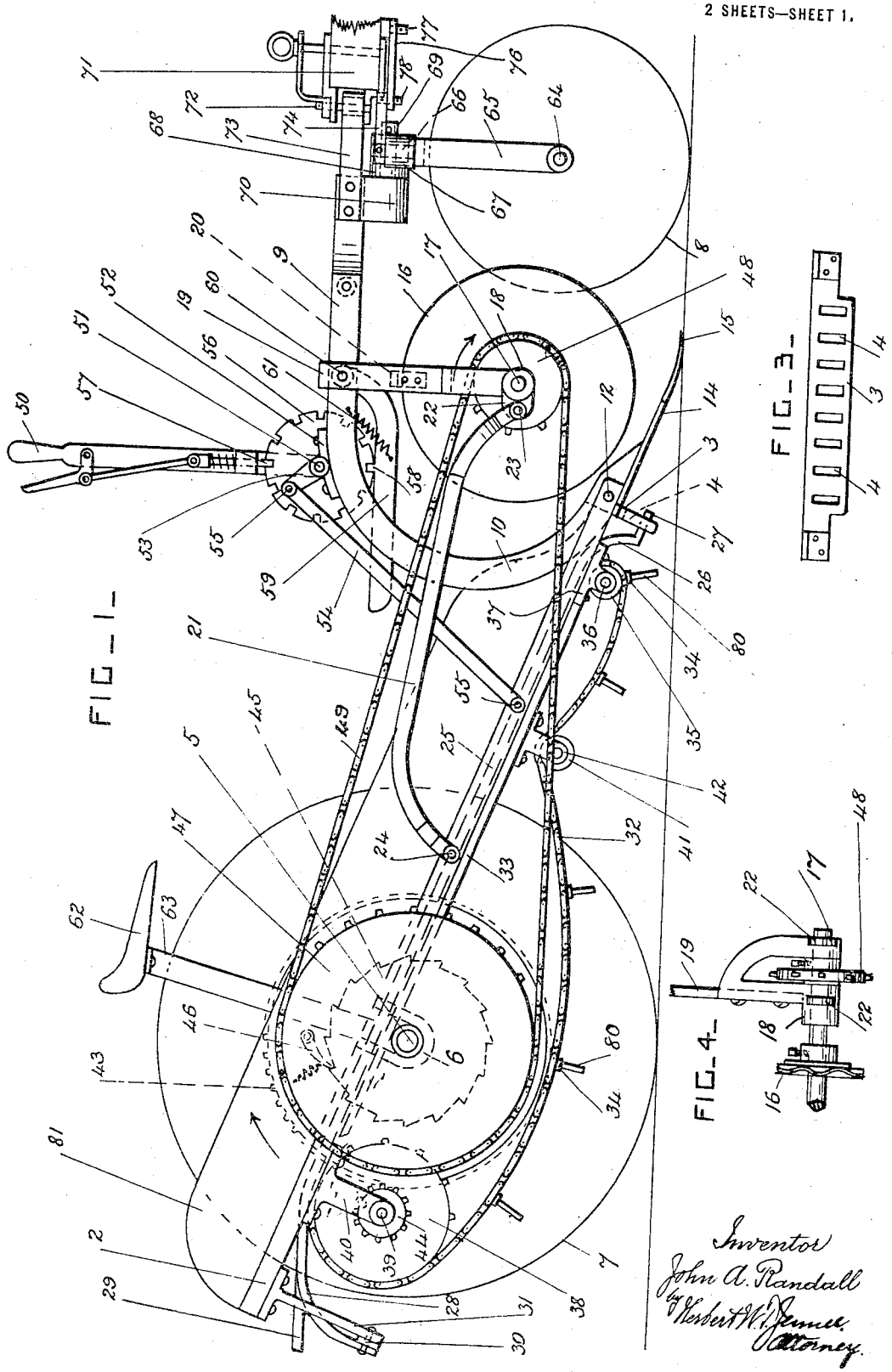

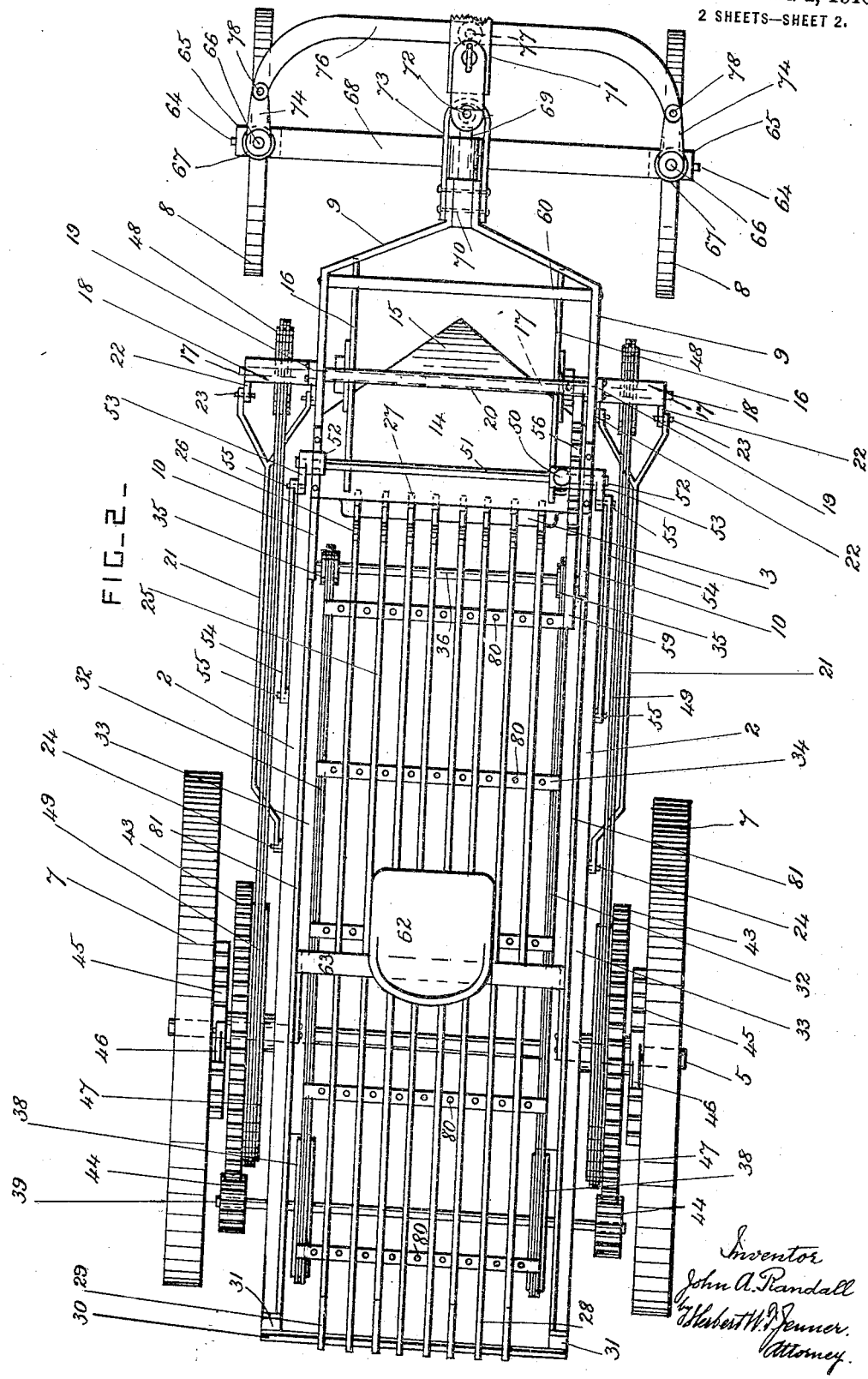

JOHN A. RANDALL, OF MINNEAPOLIS, MINNESOTA.

POTATO-DIGGER.

1,251,575.  Specification of Letters Patent.  Patented Jan. 1, 1918.

Application filed October 20, 1916. Serial No. 126,716.

*To all whom it may concern:*

Be it known that I, JOHN A. RANDALL, a citizen of the United States, residing at Minneapolis, in the county of Hennepin and State of Minnesota, have invented certain new and useful Improvements in Potato-Diggers; and I do hereby declare the following to be a full, clear, and exact description of the invention, such as will enable others skilled in the art to which it appertains to make and use the same.

This invention relates to machines for digging potatoes and other similar food crops; and it consists in the novel construction and combination of the parts hereinafter fully described and claimed.

In the drawings, Figure 1 is a side view of the principal parts of a potato digger constructed according to this invention. Fig. 2 is a plan view, certain parts being omitted in each of these views, for clearness. Fig. 3 is a detail front view of the slotted crossbar which supports the front ends of the longitudinal bars of the conveyer. Fig. 4 is a detail view of one of the bearings for the disk shaft.

The machine is provided with a main frame 2 which also forms a part of the bed of the conveyer. This frame 2 is supported in an inclined position, and it has a crossbar 3 rigidly secured to the lower side of its front end portion and provided with a series of vertical slots 4, as shown in Fig. 3. The rear and upper end portion of the frame 2 is secured to the main axle 5 by clips 6, and 7 are the main ground wheels which are mounted on the end portions of the main axle 5. These ground wheels are of any approved construction, and they preferably have projections (not shown) for engaging with the ground, so that they are revolved positively as the machine is drawn along.

The front end portions of the machine are supported by caster wheels 8, and have other parts attached to them which will be more fully described hereinafter. The caster wheels support the front end portion of a yoke 9, the forked rear end portion of which forms two curved arms 10, which are pivoted at their lower ends to the lower end portion of the frame 2, by pins 12. The curved arms 10 of the yoke have a digging blade 14 rigidly secured to them and projecting downwardly and forwardly of the pivot pins 12. This blade 14 has a curved point 15 at the middle of its forward end, and it cuts a trench in the soil and digs up the potatoes as the machine is drawn along. A great advantage is found in securing the blade directly to the yoke.

Two disks 16 are arranged above the blade 14 over its side portions, and are secured on a shaft 17 which is journaled in bearings 18 on the lower ends of uprights 19. These uprights are secured to the yoke 9 and they have a distance piece 20 secured between them above the disks. Radius links 21 are provided, and are pivoted to lugs 22 on the bearings 18 by pins 23, and to the main frame 2 by pins 24. These radius links brace the bearings 18 to the main frame, and permit the yoke to move on the pivot pins 12, and preserve the distance of the disks from the ground wheels.

The bed of the conveyer is formed of a series of longitudinal bars 25 having downwardly curved front end portions 26 and longitudinal extensions 27 at their front ends. The extensions 27 are supported by the crossbar 3, and are free to slide vertically in its slots 4. The rear ends of the bars 25 have downwardly curved end portions 28, and certain of their end portions have substantially horizontal teeth 29 secured above them for the discharge of rubbish. The end portions 28 of the bars are attached to a crossbar 30, the ends of which are secured to brackets 31 which project downwardly from the main frame 2. The bars 25 are rigidly attached to the crossbar 30, so that their front end portions or extensions 27 may rise and fall freely in the slots 4, and bear downwardly by spring pressure.

The conveyer is provided with endless side chains 32, the upper stretches of which are supported on guides 33 on the main frame. Crossbars 34 are secured at intervals to the chains 32, and have teeth 80 which project upwardly between the bars 24 of the conveyer bed. The front portions of the conveyer chains pass over wheels 35 secured on a shaft 36 which is journaled in bearings 37 secured to the frame 2, and the shaft 36 is arranged under the curved end portions 26 of the longitudinal bars 24. The conveyer shaft 36 is arranged to the rear of the curved portions 26 of the stationary conveyer bars 25, onto which the potatoes pass from the blade 14, and the two pivot pins 12 of the yoke are arranged in front of the said curved portions and they engage with the front end portions of the main frame 2 which project beyond the front end of the conveyer. The digging blade 14 is secured to the lower parts of the arms 10 which project below and in front of the pivots 12. The blade is arranged at a slight inclination to the horizontal, and its upper and rear end portion is substantially flat. This enables the blade to be drawn through the ground under the potatoes with less resistance than when the blade is more steeply inclined and when its sides are curved upwardly.

The rear portions of the conveyer chains pass over sprocket wheels 38 secured on a shaft 39 which is journaled in bearings 40 which are secured to the upper end portions of the main frame 2 behind the main axle. The lower stretches of the conveyer chains are supported by wheels 41 journaled in brackets 42 secured to the main frame, or in any other convenient manner.

The conveyer is driven from the main ground wheels 7 by toothed wheels 43 and toothed pinions 44. The toothed pinions 44 are secured on the shaft 39, and the toothed wheels 43 are mounted loosely on the axle 5. The toothed wheels 43 are operatively connected with the ground wheels 7 by ratchet mechanism of any approved construction. In the machine as shown, a ratchet wheel 45 is secured to the ground wheel, and its teeth engage with pawls 46 carried by the wheel 43, so that the conveyer is operated only when the machine is drawn forwardly.

Sprocket wheels 47 are secured to the wheels 43 and revolve with them. Sprocket wheels 48 are secured on the disk shaft 17, and 49 are endless drive chains which pass over the sprocket wheels 47 and 48, so that the disks 16 are revolved positively and in the direction of the curved arrows as the machine is drawn along. The disks are preferably corrugated, and they assist in sliding the soil and the potatoes onto the conveyer bars from the digging blade. They also prevent the potatoes and the soil from being thrown off at the sides of the digging blade.

The digging blade may be placed in line with the conveyer bars, as shown, or it may be moved pivotally in either direction, and the conveyer may also be moved pivotally of the axle, and in the reverse direction to the blade. An adjusting hand-lever 50 is mounted on a shaft 51, which is journaled in bearings 52 secured to the yoke 9. The shaft 51 has two levers 53 secured to its end portions, and 54 are connecting-rods provided with pins 55, and arranged between the levers 53 and the middle portions of the main frame. A toothed wheel 56 is secured to the shaft 51 adjacent to the hand-lever 50, and the lever 50 has a retractable catch 57 for engaging with the toothed wheel 56.

A locking detent 58 is formed on a foot-lever 59 which is pivoted to the yoke 9 by a pin 60, and the detent is normally held in engagement with the wheel 56 by a spring 61. A seat 62 for the driver is secured above the main frame 2, by any suitable support 63, and in a convenient position for operating the hand-lever 50 and the foot-lever 59. The use of the revoluble toothed wheel 56 and the detent 58 enables the angle of the conveyer to be varied to a great extent, and without moving the hand-lever into an inconvenient position, as the toothed wheel can be revolved step by step in either direction until the parts are in the most advantageous positions to suit the work to be accomplished.

The caster wheels 8 are journaled on pins 64 in forked standards 65, and the upper ends of these standards have vertical spindles 66 which are journaled in bearings 67 on the ends of a crossbar 68. The middle part of the crossbar 68 is pivoted on a horizontal pin 69 which is secured to the front end portion of the yoke 9 by a bracket 70. A draft tongue 71 is provided, and is pivoted to the front end portion of the yoke 9 by a vertical pin 72 and a loop-shaped strap or fastening 73.

The spindles 66 of the caster wheel standards have forwardly projecting arms 74 secured to their upper end portions. A crossbar 76 is pivoted at its middle part to the draft tongue by a pin 77, and has rearwardly curved end portions which are pivoted to the said arms 74 by pins 78. The draft tongue is loosely connected to the strap 73, and the other various parts are connected together with sufficient play to permit the crossbar 68 to rock on its pivot a little when the caster wheels run over uneven ground, and one wheel is raised a little above the level of the other. The caster wheels turn to the right and left simultaneously with the tongue, and they support the whole front portion of the machine and the digging blade.

When the machine is drawn along, the blade 14 digs up the potatoes, and the potatoes and soil are forced upwardly and rearwardly between the two disks 16. These disks being revolved positively assist the material to pass over the blade onto the bars of the conveyer, and the conveyer teeth 80 carry the material to the upper and rear part of the machine. The soil falls between the bars of the conveyer, and when stones and other rubbish are caught by the teeth 80 under the front end portions of the bars, and are forced against the said bars, the front end portions of the bars are raised in the slots 4 of the crossbar 3, so that the stones can pass over the conveyer wheels and the conveyer is not obstructed.

The stalks and other similar rubbish which is carried to the upper end of the conveyer are discharged over the horizontal teeth 29, and the potatoes roll off these teeth and are discharged over the curved end portions 28 of the conveyer bars. The conveyer is also provided with suitable guard plates 81 at its sides, and the wheels and gearing have also suitable guards to prevent them from being obstructed by the soil.

As the forward end of the machine is lowered for digging, the blade 14, on account of being secured to the yoke, lowers to a greater extent at its heel than at its point, so that the deeper the blade digs the more nearly flat it runs, and it therefore digs deep enough across the row without forcing the point too deeply into the ground.

The disks 16 are preferably adjusted by sliding the shaft 17 longitudinally in its bearings 18, after loosening the set-screws which secure the sprocket wheels 48. These disks are adjusted both horizontally in a longitudinal direction and also vertically.

What I claim is:

1. In a potato digger, a wheeled frame, a conveyer carried by the frame, a yoke pivoted to the front end portion of the frame and arranged in advance of the conveyer, a digging blade secured to and extending between the lower end portions of the said yoke and projecting forwardly of its pivot, and means for adjustably locking the yoke to the frame.

2. In a potato digger, a wheeled frame, a conveyer carried by the frame, a yoke pivoted to the front end portion of the frame by two pivot pins and arranged in advance of the said conveyer, a digging blade having a substantially flat rear end portion secured to and extending between the lower end portions of the said yoke and arranged below the level of and projecting forwardly of its pivot pins, and means for adjustably locking the yoke to the frame.

3. In a potato digger, a wheeled frame, a conveyer bed formed of longitudinal bars supported by the said frame and provided with downwardly curved front end portions, means for moving the potatoes rearwardly over the said bed, a yoke pivoted to the front end portion of the frame and arranged in advance of the curved end portions of the conveyer bars, a digging blade secured to and extending between the lower end portions of the said yoke and projecting forwardly of its pivots, and means for adjustably locking the yoke to the frame.

4. In a potato digger, a wheeled frame, a crossbar secured to the front end portion of the frame and provided with vertical slots, a conveyer bed formed of longitudinal bars supported in the said frame and provided with downwardly curved front end portions having extensions which are slidable in the said slots, means for moving the potatoes rearwardly over the said bed, a yoke pivoted to the front end portion of the frame and arranged in advance of the curved end portions of the conveyer bars, a digging blade secured to the lower end portions of the said yoke and projecting forwardly of its pivots, and means for adjustably locking the yoke to the frame.

5. In a potato digger, a wheeled frame, a conveyer carried by the frame, a yoke pivoted to the front end portion of the frame and arranged in advance of the conveyer, a digging blade secured to and extending between the lower end portion of the said yoke and projecting forwardly of its pivot, means for adjustably locking the yoke to the frame, revoluble soil-guiding disks supported from the said yoke and arranged over the said blade, and means for pivotally supporting the front end portion of the said yoke.

6. In a potato digger, a wheeled frame, a conveyer carried by the frame, a yoke pivoted to the front end portion of the frame and arranged in advance of the conveyer, a digging blade secured to and extending between the lower end portion of the said yoke and projecting forwardly of its pivot, means for adjustably locking the yoke to the frame, uprights secured to and depending from the upper portion of the yoke, a shaft journaled in the lower parts of the said uprights, soil-guiding disks secured on the said shaft and arranged over the said blade, and means for pivotally supporting the front end of the said yoke.

In testimony whereof I have affixed my signature.

JOHN A. RANDALL.